United States Patent [19]

DeVries

[11] Patent Number: 5,721,914
[45] Date of Patent: Feb. 24, 1998

[54] SYSTEM AND METHOD FOR HIERARCHICAL DATA DISTRIBUTION

[75] Inventor: Larry R. DeVries, Cedar Rapids, Iowa

[73] Assignee: MCI Corporation, Washington, D.C.

[21] Appl. No.: 527,901

[22] Filed: Sep. 14, 1995

[51] Int. Cl.⁶ .................................................. G06F 17/30
[52] U.S. Cl. ...................... 395/615; 395/611; 395/200.01
[58] Field of Search ................................ 395/601, 611, 395/602, 612, 613, 614, 615, 616, 603, 604, 605, 606, 607, 608, 609, 610, 670, 671, 672; 359/118

[56] References Cited

U.S. PATENT DOCUMENTS

| | | | |
|---|---|---|---|
| 4,432,057 | 2/1984 | Daniell et al. | 395/608 |
| 4,853,843 | 8/1989 | Ecklund | 395/619 |
| 5,218,632 | 6/1993 | Cool | 379/126 |
| 5,261,094 | 11/1993 | Everson et al. | 395/617 |
| 5,341,476 | 8/1994 | Lowell | 395/200.09 |
| 5,351,146 | 9/1994 | Chan et al. | 359/118 |
| 5,398,336 | 3/1995 | Tantry et al. | 395/614 |
| 5,418,946 | 5/1995 | Mori | 395/601 |
| 5,428,782 | 6/1995 | White | 395/671 |
| 5,535,322 | 7/1996 | Hecht | 395/201 |
| 5,596,744 | 1/1997 | Dao et al. | 395/610 |

*Primary Examiner*—Thomas G. Black
*Assistant Examiner*—Ruay Lian Ho

[57] ABSTRACT

The hierarchical data distribution system (HDDS) includes a top level master database system, bottom level client servers, each with its own database copy, and at least one intermediate database level. HDDS is an event driven pusher type system. The entry of update data into the system invokes the distribution process. First, the master database system is updated. Then, the master database system updates several database systems at the first intermediate database level. Each database system at the first intermediate database level then updates several database systems at the next lower database level. This may be a lower level intermediate level or it may be client servers. This process continues until the lowest level database systems, the client servers, have been updated. The distribution process performs any necessary reformatting, data assembly and data view processing before transmitting the update data. Each higher level database system must update fewer lower level servers and overall update performance is improved. If communications to a destination server are not functional, the distribution system detects this immediately because it is unable to establish communications with the destination server. Transitional inconsistency is reduced because the distribution process is invoked for all destination servers at the same time. System resources are not wasted because communications are only established when there is data to be updated.

32 Claims, 15 Drawing Sheets

SYSTEM AND METHOD FOR HIERARCHICAL DATA DISTRIBUTION

BACKGROUND OF THE INVENTION

FIELD OF THE INVENTION

The invention relates generally to distributed databases, and in particular, to hierarchical distribution of data to distributed databases.

BACKGROUND INFORMATION

Local and wide area networks allow multiple clients to simultaneously access databases stored on a server. As the number of clients grows, database accesses increase. If the database is stored on only one server, the maximum throughput of that server is a limit on the amount of access clients have to the database. One solution to this problem is to store a complete copy of the database on multiple servers and distribute client accesses relatively evenly among the servers. This allows database access far greater than would be possible with only one server.

A problem arises, however. When a database which is stored on multiple servers must be updated, the copy on each server must be updated. This can be accomplished by updating a master copy of the database, then updating the other copies from the master copy. During the update process, not all copies of the database are identical. This is because at any given point in the process, some copies have been updated and some have not. This condition is known as transitional inconsistency. Some clients accessing the database will obtain updated data and some will not. A problem arises if the period of transitional inconsistency becomes so long as to seriously affect a significant number of clients. If the number of database copies is large, it will take an unacceptably long time for the master to update all the copies. A need exists to update multiple database copies with improved performance.

A typical prior art system is exemplified by U.S. Pat. No. 5,251,094 to Everson et al. In this system, a first program in a collector node instructs a second program in a collectee node to send all updates to a database since the last conversation. The second program processes queries to retrieve any changes made since the last conversation between the collector and collectee nodes and sends the data to the first program, which updates the copy of the database on its own system. This is an example of a puller type database system, that is, a system in which the database server which is to be updated initiates a request for updating and communicates the request to the master database. The master database then transmits the requested data to the database server.

A problem arises with puller type systems when the communications between the master database and a server are not functioning. The lack of communications prevents the request for update from the server from reaching the master. Because the master only sends updates when requested, the server will never be updated. Furthermore, the master will not soon detect that the server is out of communication because of the absence of requests from the server is the normal condition. A need exists to detect when communication cannot be established with a server containing a database to be updated.

A further problem arises when the update process is interrupted during an update communication. Such an interruption may occur, for example, due to a communications outage or due to failure of the master database system or the server. Interruption of the update process may cause the replicated data to be missing or defective. A need exists for guaranteed delivery of update data, in spite of interruptions in the update process.

Another problem arises with puller type systems because of the periodic nature of the update requests. If the period between update requests is set too long, transitional inconsistency will likewise be of long duration. If the period between update requests is set too short, network resources are wasted. Many update requests are sent which do not result in update data being transmitted simply because not enough time has elapsed to allow any update data to be entered. A need exists to reduce the duration of transitional inconsistency present during updates of multiple database copies, and at the same time reduce waste of network resources.

Another type of problem arises when the databases on different servers are in different formats. The change to the master database cannot simply be replicated into the destination databases. The change must be reformatted and entered into the destination database in its specified format. A need exists to reformat database updates to the format specified by the database to be updated.

SUMMARY OF THE INVENTION

The hierarchical data distribution system (HDDS) of the present invention provides a system and method for updating multiple database copies with improved performance. HDDS reduces the duration of transitional inconsistency and the waste of network resources during updates of multiple database copies. HDDS provides an indication when communication cannot be established with a server containing a database to be updated. HDDS provides guaranteed delivery of update data, in spite of interruptions in the update process. HDDS also provides reformatting of database updates, as well as more sophisticated data assembly and data view processing of database updates.

HDDS includes a top level master database system, bottom level client servers, each with its own database copy, and at least one intermediate database level. First, the master database system is updated. Then, the master database system updates several database systems at the first intermediate database level. Each database system at the first intermediate database level then updates several database systems at the next lower database level. This may be a lower level intermediate level or it may be client servers. This process continues until the lowest level database systems, the client servers, have been updated. Each higher level database system must update fewer lower level servers and overall update performance is improved.

HDDS is an event driven pusher type system. The entry of update data into the system invokes the distribution process. If communications to a destination server are not functional, the distribution system detects this immediately because it is unable to establish communications with the destination server. Transitional inconsistency is reduced because the distribution process is invoked for all destination servers at the same time. System resources are not wasted because communications are only established when there is data to be updated. In addition, the distribution process performs any necessary reformatting, data assembly and data view processing before transmitting the update data.

An example of a data record that would be handled by the HDDS system is a customer subscription entry for a calling card. The record would contain various information about the customer such as the Card Number, the customer name, the business name, card restrictions, available feature sets, etc. Another example of a data record is a personal 800 number subscription entry. This record would contain the 800 number, the Personal Identification Number (PIN), and the terminating number.

BRIEF DESCRIPTION OF THE DRAWINGS

FIG. 2b is an exemplary block diagram of a master or intermediate database server of FIG. 2a.

FIG. 2c is an exemplary block diagram of a destination database server of FIG. 2a.

FIG. 3a is a diagram of data flow in the exemplary network data distribution system 200 of FIG. 2a.

FIG. 3b is a block diagram of processing implemented in network data distribution system 200 of FIG. 2a.

FIG. 4a is a flow diagram of a master distribution process 360 implemented in master server 204 of FIG. 2a.

FIG. 4b is a flow diagram of a subprocess of step 418 of master distribution process 360, implemented in master database server 204 of FIG. 2a.

FIG. 5a is a flow diagram of an intermediate distribution process 380 implemented in each intermediate server of FIG. 2a.

FIG. 5b is a flow diagram of a subprocess of step 518 of intermediate distribution process 380, implemented in each intermediate server of FIG. 2a.

FIG. 5c is a flow diagram of a subprocess of step 502 of intermediate distribution process 380, implemented in each intermediate server of FIG. 2a.

FIG. 6a is a flow diagram of a destination process 356 implemented in each destination server of FIG. 2a.

FIG. 6b is a flow diagram of a subprocess of step 602 of destination process 356, implemented in each destination server of FIG. 2a.

DETAILED DESCRIPTION OF THE INVENTION

Figure 1:
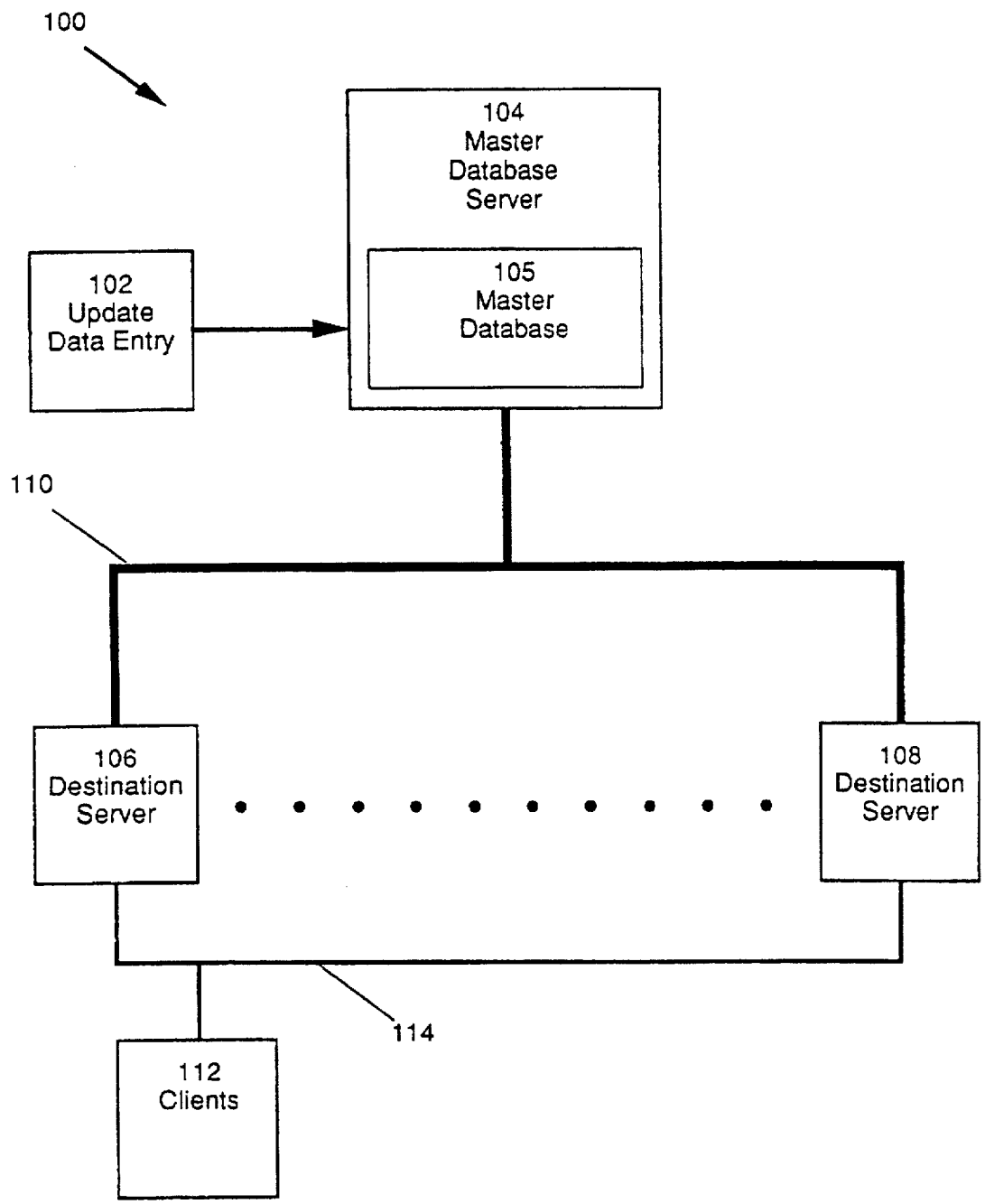
FIG. 1 is a block diagram of a prior art network data distribution system 100.

FIG. 1 is a block diagram of a prior art network data distribution system 100. Included are update data entry 102, which represents one or more terminals used to enter data to update the database. Update data entry 102 is connected to master database server 104. Master server 104 contains the master copy 105 of the database being updated. Updates entered on update data entry 102 are entered into master database 105. Master database server 104 is connected to network 110. Network 110 also connects to multiple destination database servers 106–108. Updates made to master database 105 are communicated by master database server 104 over network 110 to each destination database server 106–108. Each destination database server 106–108 is also connected to network 114. Network 114 allows clients 112 to access the databases on destination database servers 106–108.

Figure 2A:
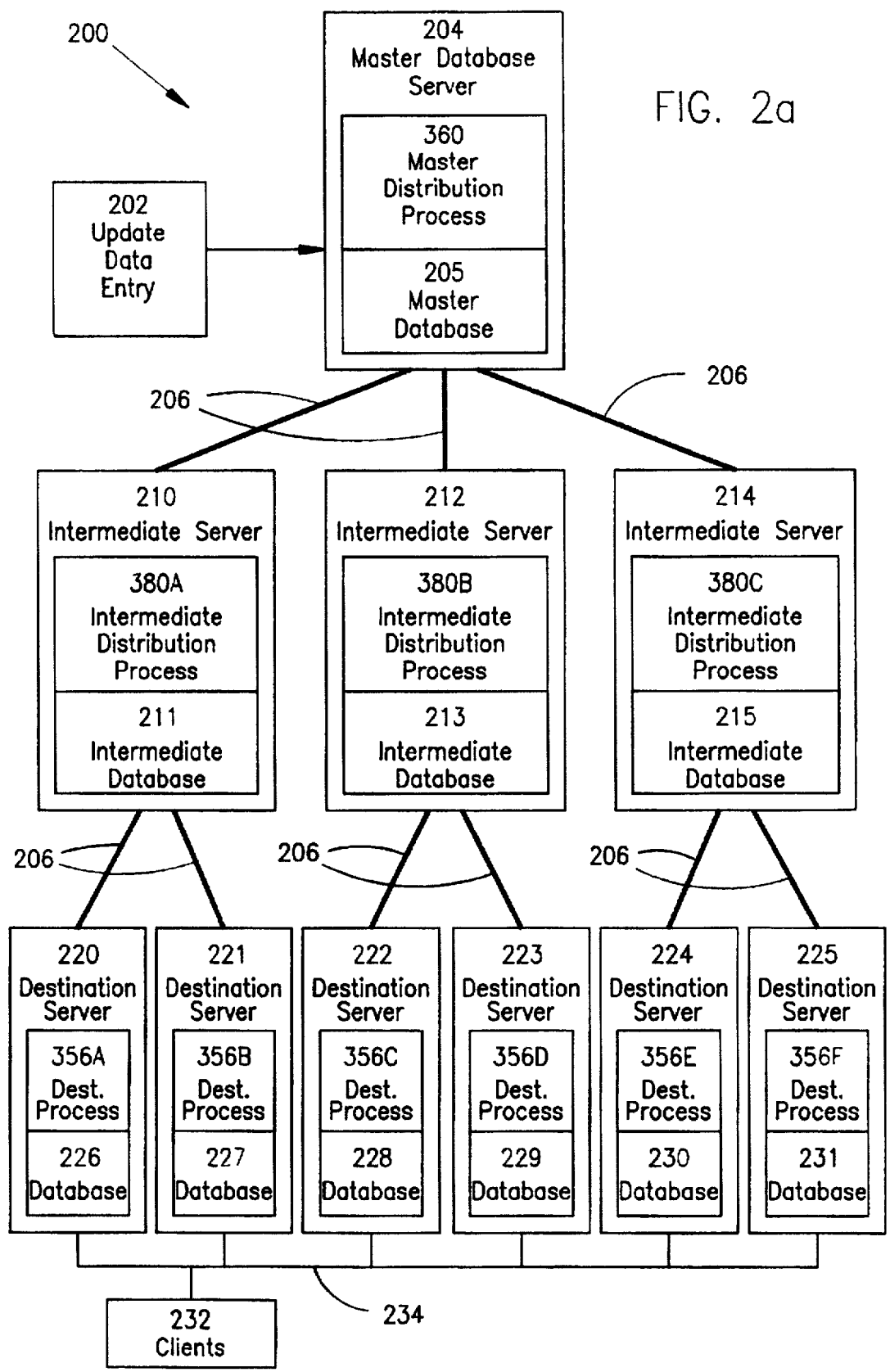
FIG. 2a is a block diagram of an exemplary network data distribution system 200, in accordance with the present invention.

FIG. 2a is a block diagram of an exemplary network data distribution system 200, in accordance with the present invention. Included is update data entry 202, which represents one or more terminals used to enter data to update the database. Update data entry 202 is connected to master database server 204. Master server 204 is, in one embodiment, a mainframe computer system, such as, for example, an ES/9000. Master server 204 contains the master copy 205 of the database being updated. Master server 204 also executes master distribution process 360. Updates entered on update data entry 202 are promptly entered into master database 205. Master database server 204 is connected to network 206. Network 206 is a standard network such as System Network Architecture (SNA)

Network 206 couples master server 204 to multiple intermediate database servers 210, 212 and 214. Servers 210, 212 and 214 are intermediate in level between master server 204 and destination database servers 220–225. Although only one intermediate level is shown in FIG. 2a, it is also in accordance with the present invention to have more than one intermediate level. In one embodiment, each intermediate database server is a computer system such as, for example an RS/6000. Intermediate database servers 210, 212 and 214 contain intermediate copies 211, 213 and 215 of the database being updated. Each intermediate database server 210, 212 and 214 also executes an instance of intermediate distribution process 380, represented by blocks 380A, 380B and 80C. The three intermediate database servers 210, 212 and 214 shown represent multiple intermediate database servers that may be connected by network 206.

Network 206 also couples each intermediate database server to multiple destination database servers 220–225. Each destination database server is a computer system such as, for example, an RS/6000. Destination database servers 220–225 contain lowest level copies 226–231 of the database being updated. Each destination database server also executes an instance of destination process 356, represented by blocks 356A–F. The six destination database servers shown represent multiple destination database servers that may be connected to network 206. Clients 232, which access the destination database servers, are coupled to the destination database servers by local/wide area network 234 which is a standard network such as, for example, Ethernet or Token Ring.

Updates made to master database 205 are communicated from master database server 204 over network 206 to intermediate database servers 210, 212 and 214. These updates are then communicated from the intermediate database servers to the destination database servers. The network connections 206 shown in FIG. 2a are exemplary of SNA. Such a network would typically utilize Advanced Program to Program Communications (APPC) protocol and LU6.2 devices. However, any network architecture which provides the necessary communication connectivity may be used.

Figure 2B:
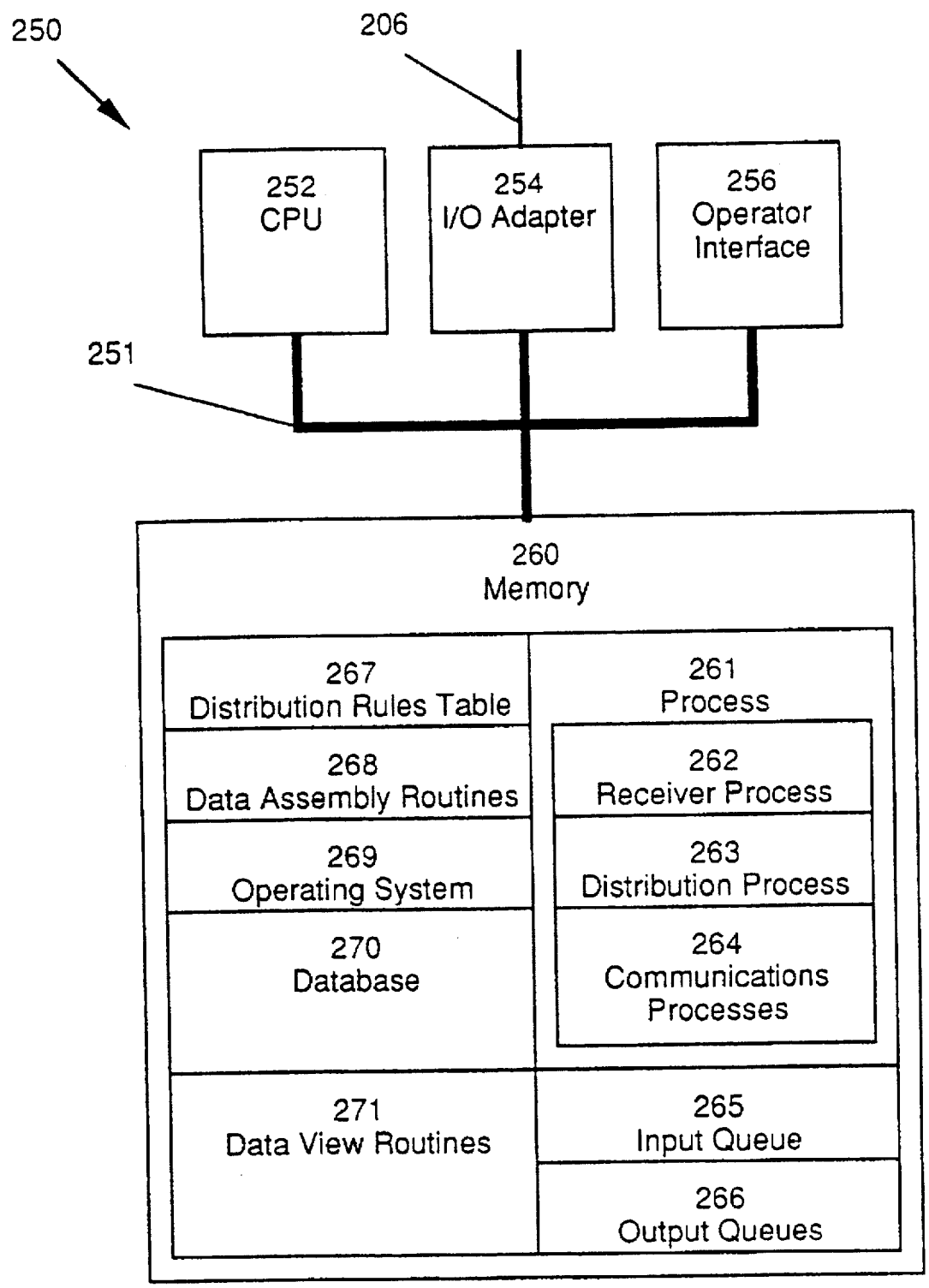

FIG. 2b is an exemplary block diagram of a database server 250, which is representative of master server 204 and intermediate servers 210, 212 and 214 of FIG. 2a. In one embodiment, each database server is a computer system such as, for example an ES/9000 used for the master server or a RS/6000 used for an intermediate server. System 250 includes a CPU 252, for executing program instructions and processing data, memory 260, for storing program instructions executed by and data processed by CPU 252, and at least one I/O adapter 254, for communicating with other devices and transferring data in and out of the computer system, for example, over network 206. System 250 may also include an operator interface 256, for providing status information to and accepting commands from a system operator. All these elements are interconnected by bus 251, which allows data to be intercommunicated between the elements.

Memory 260 may include both volatile storage devices, such as, for example, random access memory (RAM) and non-volatile storage devices, such as, for example, hard disk, floppy disk, optical disk, electrically-alterable programmable read only memory, battery-backed up RAM, etc. Memory 260 is accessible to CPU 252 over bus 251 and includes operating system 269, process 261, which is either master distribution process 360 or intermediate distribution process 380, input queue 265, output queues 266, distribution rules tables 267, data assembly routines 268, database 270 and data view routines 271. Process 261 includes receiver process 262, distribution process 263 and communications processes 264. These processes are similar in both master distribution process 360 and intermediate distribution process 380. CPU 252's execution of receiver process 262 receives data and stores it in input queue 265. In the case of master server 204, data is received from update data entry 202. In the case of intermediate level servers, data is received from higher level servers, either master server 204 or higher level intermediate servers. CPU 252 execution of distribution process 263 causes process 263 to remove data from input queue 265, process it with distribution rules table 267, data assembly routines 268 and data view routines 271 and store the result in one of the output queues 266. CPU 252 execution of communications processes 264 causes each instance of process 264 to remove data from its respective output queue and transmit it to lower level receivers. In the case of the master server, the lower level receivers are intermediate level servers. In the case of an intermediate level server, the lower level receivers are either lower level intermediate servers or destination database servers. Database 270 is a master or intermediate copy of each database to be updated.

Figure 2C:
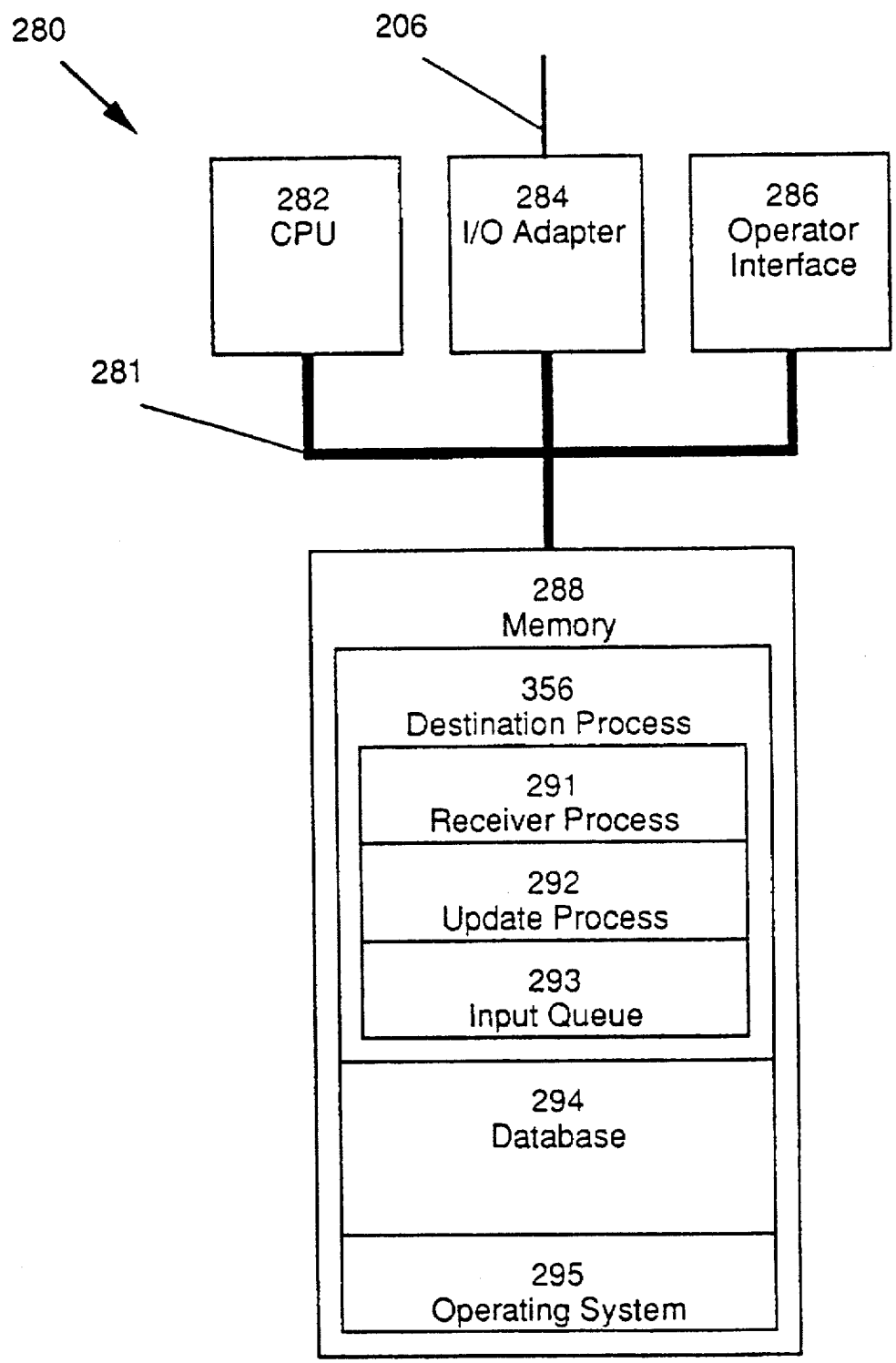

FIG. 2c is an exemplary block diagram of a database server 280, which is representative of destination servers 220–225 of FIG. 2a. Each database server is a computer system such as, for example a RS/6000. System 280 includes a CPU 282, for executing program instructions and processing data, memory 288, for storing program instructions executed by and data processed by CPU 282, and at least one I/O adapter 284, for communicating with other devices and transferring data in and out of the computer system, for example, over network 206. System 280 may also include an operator interface 286, for providing status information to and accepting commands from a system operator. All these elements are interconnected by bus 281, which allows data to be intercommunicated between the elements. Memory 288 may include both volatile storage devices, such as, for example, random access memory (RAM) and non-volatile storage devices, such as, for example, hard disk, floppy disk, optical disk, electrically-alterable programmable read only memory, battery-backed up RAM, etc. Memory 288 is accessible to CPU 282 over bus 281 and includes operating system 295, database 294 and destination process 356, which includes receiver process 291, update process 292 and input queue 293. CPU 282 execution of receiver process 291 receives data from an intermediate server and stores it in input queue 293. CPU 252 execution of update process 292 causes process 292 to remove data from input queue 293 and enter it into database 294.

Figure 3A:
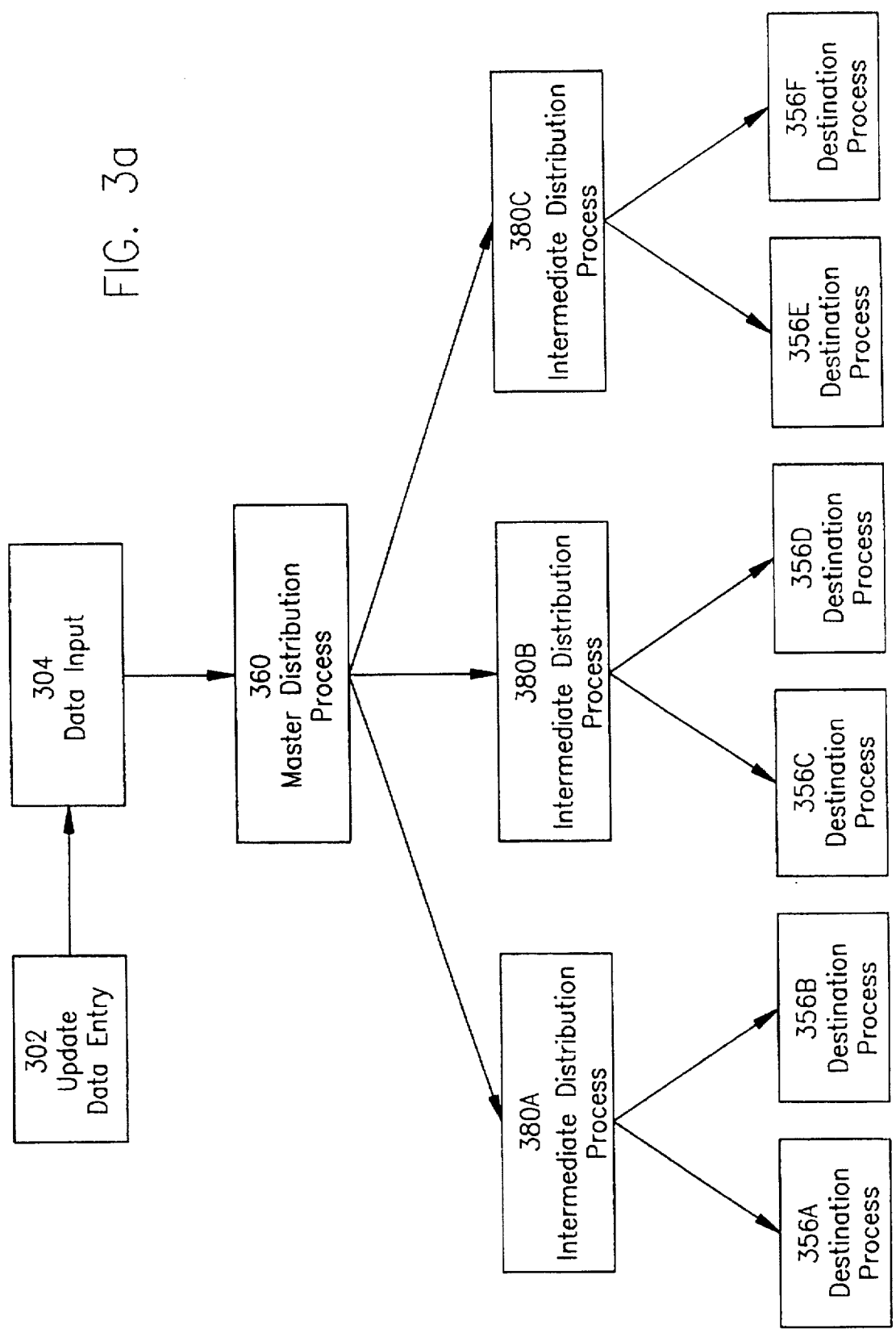

FIG. 3a is a diagram of data flow in the exemplary network data distribution system 200 of FIG. 2a. Included is update data entry 302, which represents one or more terminals used to enter data to update the database. Update data entry 302 communicates the entered data to data input process 304. Data input process 304 supports the input of both customer and configuration data into the database. Data input process 304 communicates the input data to master distribution process 360. Master distribution process 360, implemented on master server 204, processes the incoming data using soft-coded distribution rules, data assembly and data view routines. Master distribution process 360 then distributes the data to multiple instances of intermediate distribution process 380, represented by intermediate distribution processes 380A, 380B and 380C. Intermediate distribution process 380A distributes the data sent from master distribution process 360 to the instances of destination process 356 represented by destination processes 356A and 356B. Intermediate distribution process 380B distributes the data sent from master distribution process 360 to the instances of destination process 356 represented by destination processes 356C and 356D. Intermediate distribution process 380C distributes the data sent from master distribution process 360 to the instances of destination process 356 represented by destination processes 356E and 356F.

Figure 3B:
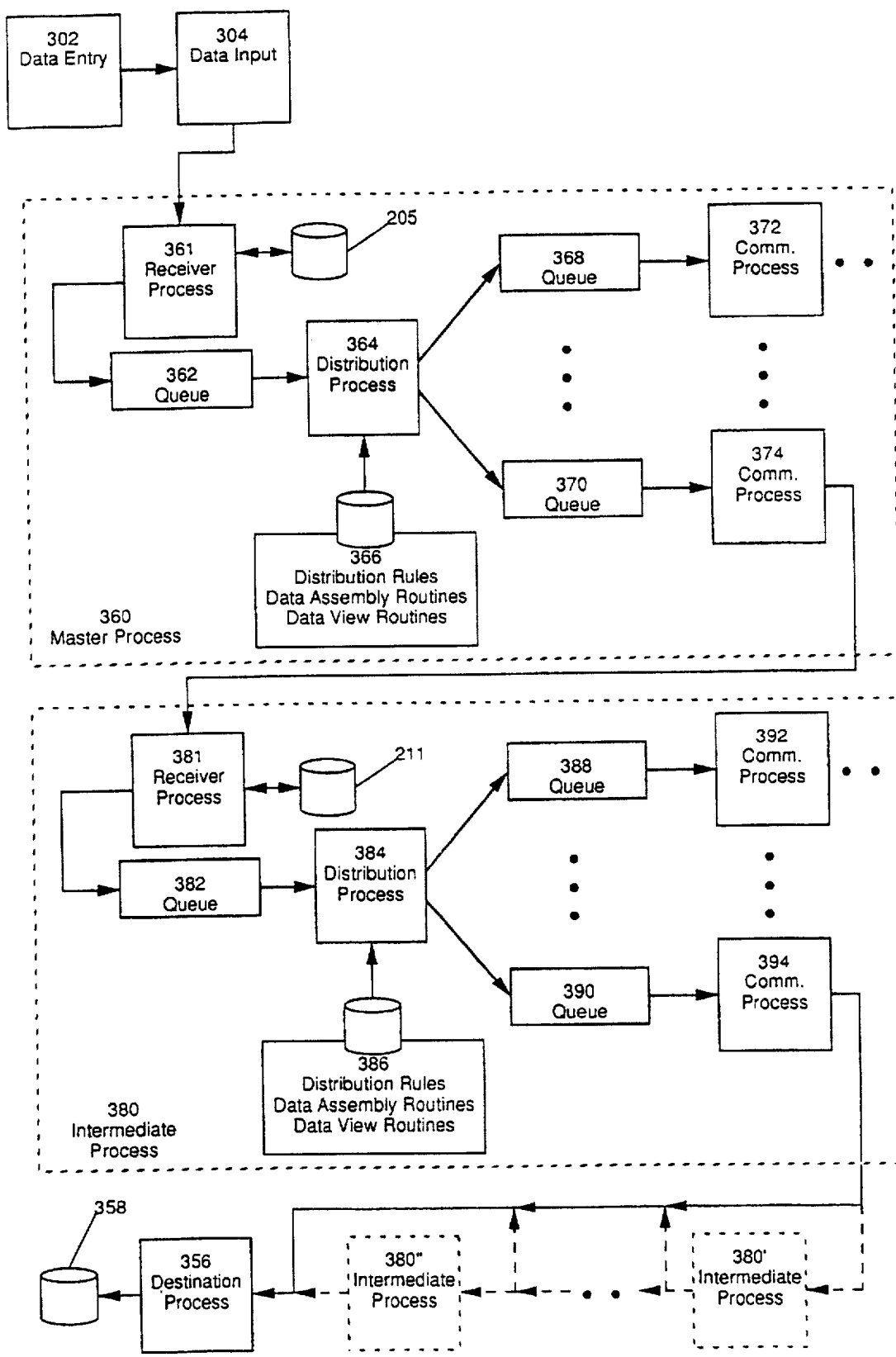

FIG. 3b is a block diagram of the processing implemented in network data distribution system 200 of FIG. 2a. Data entry 302 transmits an update data record to data input process 304. Data input process 304 communicates the update data record to receiver process 361 of master distribution process 360. Receiver process 361 receives the update data record, stores it to master database 205 and writes it to input queue 362. The presence of data in queue 362 causes distribution process 364 to be invoked. Distribution process 364 processes the update data record using distribution rules, data assembly and data view routines 366. This produces what is termed a distribution record. Distribution process 364 then writes the distribution record to one or more communication output queues 368 to 370 specified by the distribution rules. Each update data record is processed separately for each output queue to which it is to be written. Therefore, an update data record written to one output queue may be processed differently from the same record written to a different output queue. Queues 368 to 370 represent multiple output queues which exist in master distribution process 360. The presence of data in a queue 368 to 370 causes a corresponding communication process 372 to 374 to be invoked. Communication processes 372 to 374 represent multiple communication processes which may be invoked in master distribution process 60. Each communication process 372 to 374 communicates with and transmits data to a different intermediate distribution process.

Receiver process 381 of intermediate distribution process 380 receives the distribution record, stores it to the intermediate database, for example 211, and writes it to its input queue 382. Although for clarity only one intermediate distribution process 380 is shown, there is actually an intermediate distribution process 380 corresponding to each communication process 372–374 of master distribution process 360. In one embodiment each intermediate server executes only one intermediate distribution process 380. In another embodiment, some intermediate servers may execute more than one intermediate distribution process. This is useful, for example, because it allows the effects on the overall system of non-operational hardware to be minimized. The intermediate distribution processes which would otherwise run on the non-operational hardware may be run on the remaining operational hardware. This may be achieved using standard multi-tasking, multi-threaded operating systems. The presence of data in input queue 382 causes distribution process 384 to be invoked. Distribution process 384 processes the distribution record using distribution rules, data assembly and data view routines 386.

Distribution process 384 then writes the processed distribution record to one or more communication output queues 388 to 390 specified by the distribution rules. Each update data record is processed separately for each output queue to which it is to be written. Therefore, an update data record written to an output queue may be processed differently from the same record written to a different output queue. Queues 388 to 390 represent multiple output queues which exist in intermediate distribution process 380. The presence of data in a queue 388 to 390 causes a corresponding communication process 392 to 394 to be invoked. Communication processes 392 to 394 represent multiple communication processes which may be invoked in intermediate distribution process 380. Each communication process 372 to 374 communicates with and transmits data to a different downline process. Each downline process may either be a destination process 356 or another intermediate distribution process 380'. If the downline process is destination process 356, destination process 356 receives the record and stores it in its database 358. If the downline process is lower-level intermediate distribution process 380', process 380' processes the record and communicates it in turn to a downline process which may likewise be either a destination process 356 or another lower-level intermediate distribution process 380". As a result, there may be multiple levels of intermediate distribution processing between master distribution process 360 and destination process 356.

Figure 3C:
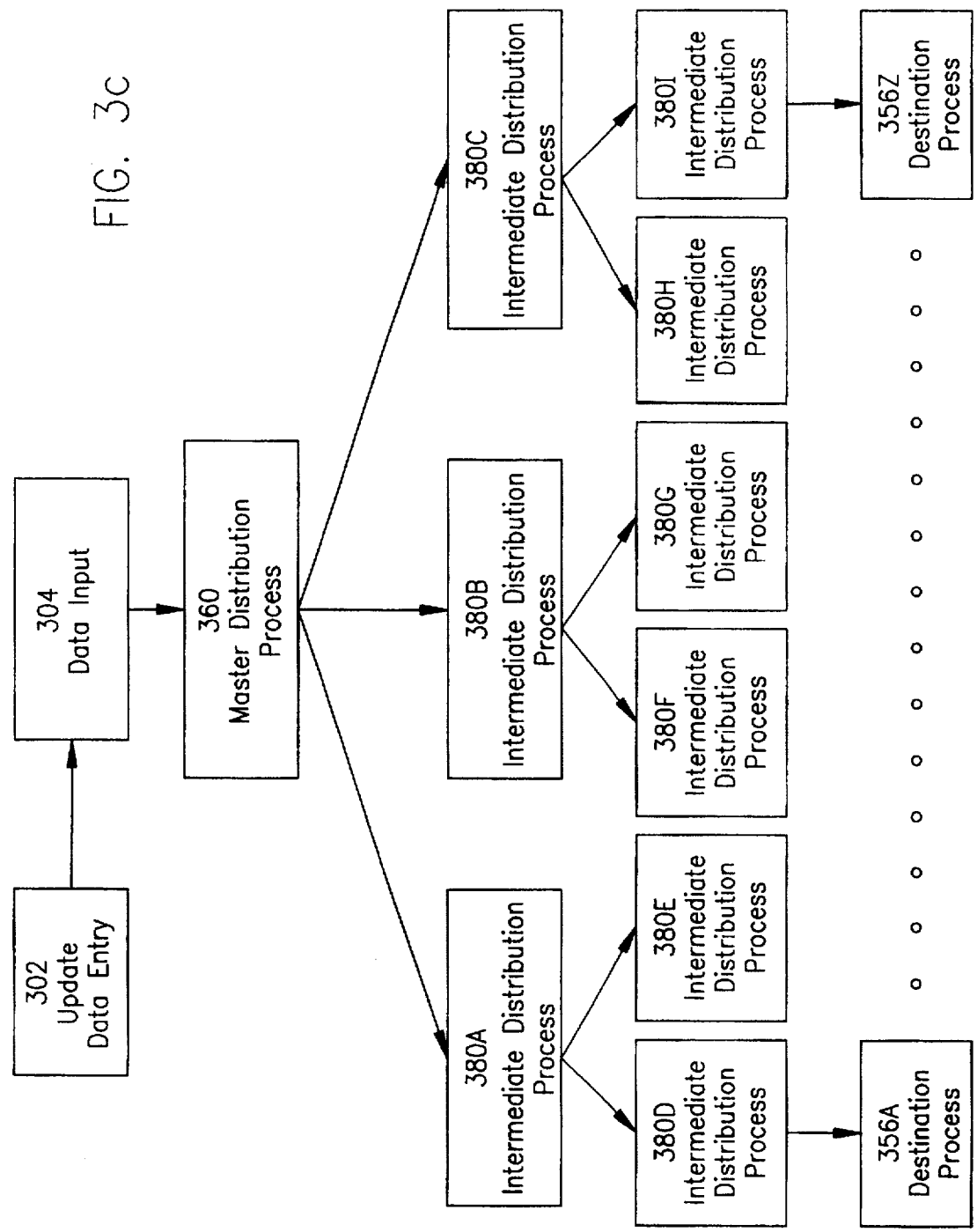
FIG. 3c is a diagram of data flow in an exemplary network in which there are two levels of intermediate distribution processing, in accordance with the present invention.

FIG. 3c is a data flow diagram of an exemplary network in which there are two levels of intermediate distribution processing. Master distribution process 360 processes the incoming data and distributes it to multiple instances of intermediate distribution process 380, represented by intermediate distribution processes 380A, 380B and 380C. Intermediate distribution processes 380A, 380B and 380C in turn process the data and distribute it to multiple instances of intermediate distribution process 380 at a lower intermediate level of hierarchy. The multiple instances of intermediate distribution process 380 are represented by intermediate distribution processes 380D-I. Intermediate distribution processes 380D-I then process the data and distribute it to multiple instances of destination process 356 represented by destination processes 356A-Z.

Figure 4A:
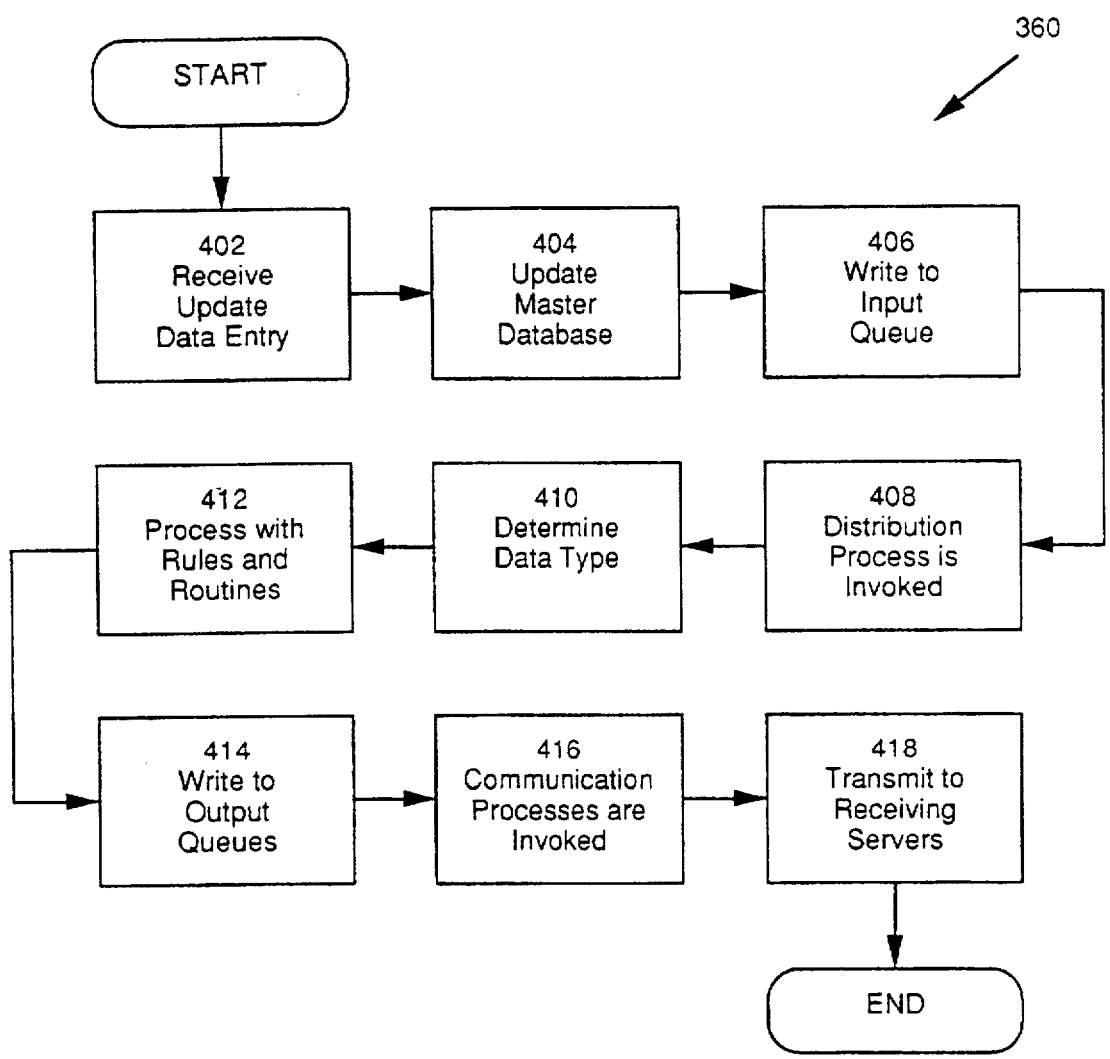

FIG. 4a is a flow diagram of master distribution process 360, which is implemented by program instructions executed by the CPU of master server 204. It is best understood when viewed in conjunction with FIG. 2a. Process 360 begins with step 402, in which an update data entry transaction is received by the receiver process of master database server 204. In step 404, the update information is written by the receiver process of server 204 to master database 205. In step 406, the update data record is written to the input queue. In step 408, the distribution process is invoked. The distribution process is event driven, that is, the writing of a record to the input queue causes the distribution process to be invoked. In step 410, the distribution process determines the data type of the update data record being processed. In step 412, the update data record is processed as specified by the distribution rules for that record's data type. The distribution rules specify reformatting and transformations to be performed to the update data record, as well as more extensive data assembly and data view routines. The data assembly routines are capable of assembling an output update data record from one or more received update data records and from records already present in the database. The data view routines are capable of individually processing the fields of one or more received update data records and other records and selectively including these fields in any arrangement in the output update data record. The rules also specify the lower level servers and output queues to which each update data record is to be written. Each update data record is processed separately for each output queue to which it is to be written. Therefore, an update data record written to one output queue may be processed differently from the same record written to a different output queue. In step 414, the update data record is written to each output queue specified by the distribution rules. In step 416, the communication processes are invoked. The communication processes are event driven, that is, the writing of a record to an output queue causes the corresponding communication process to be invoked. In step 418, each active communication process transmits its associated output queue to the specified receivers. Process 360 then ends.

Figure 4B:
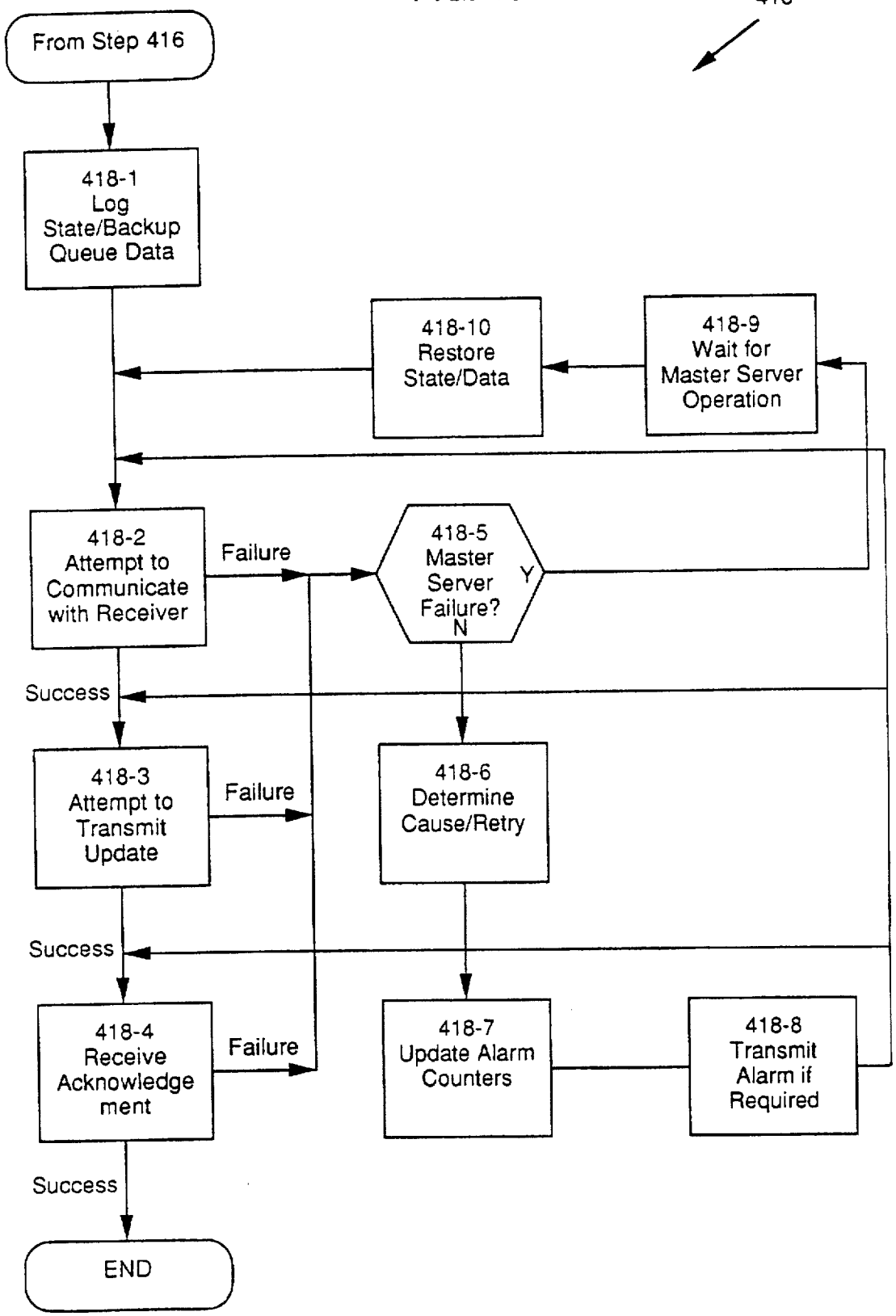

FIG. 4b is a flow diagram of a subprocess of step 418 of master distribution process 360. Subprocess 418 interacts with the subprocess of step 502 of FIG. 5a, as is explained below. Subprocess 418 is entered from step 416 of master distribution process 360 and begins with step 418-1 in which the master server logs its state and backs up the data to be communicated. In step 418-2, the master server attempts to establish communication with a lower level server. If the communication attempt is successful, the process goes to step 418-3, in which the master server attempts to transmit the update to the lower level server. If the transmission attempt is successful, the process goes to step 418-4, in which the master server waits to receive an acknowledgment that the transmitted data was successfully received and saved in safe storage on the lower level server. If the acknowledgment is successfully received, the process ends.

If any of steps 418-2, 418-3, or 418-4 fail, the process goes to step 418-5, in which it is determined whether the master server has failed. If the master server has not failed, the process goes to step 418-6, in which the cause of the failure of steps 418-2, 418-3, or 418-4, and the correct retry action, are determined. Step 418-2 will fail if communications cannot be established with the lower level server, for example, if there is a communications outage or if the lower level server has failed. Step 418-3 will fail if the update cannot be transmitted to the lower level server, typically for similar reasons. Step 418-4 will fail if the master server fails to receive an acknowledgment, for example, if a timeout occurs before the acknowledgment is received or a non-acknowledgment is received. Again, typical causes are a communications outage or failure of the lower level server. In step 418-7, the alarm counters are updated depending upon the failure cause determined in step 418-6. In step 418-8, if any of the alarm counters have exceeded their specified values, an alarm is transmitted to the network alarm reporting system. The specified values of the alarm counters are softcoded and can readily be changed. The alarm provides a timely indication of an update failure and may be used to indicate to the network operator that corrective action should be taken on the lower level server. The process then continues with either step 418-2, 418-3, or 418-4 depending on the cause of the failure and the retry action determined in step 418-6.

If the master server has failed, the master server is not operating. Typically, failure of the master server will cause alarms to be transmitted to the network alarm reporting system independently of this process. The process goes to step 418-9, which is a block that simply indicates that the process waits until operation of the master server is restored. Once the master server is again operational, the process goes to step 418-10, in which the state previously logged and the data previously backed up are restored. The process then goes to step 418-2 and resumes the delivery attempt. The process continues indefinitely until transmission is successful or until the process is stopped by external intervention, for example, in response to alarms reported by the network alarm reporting system. When transmission is successful, the process ends. In this way, HDDS provides guaranteed delivery of all updates, as well as timely indication of failure of a server or a communication outage.

Figure 5A:
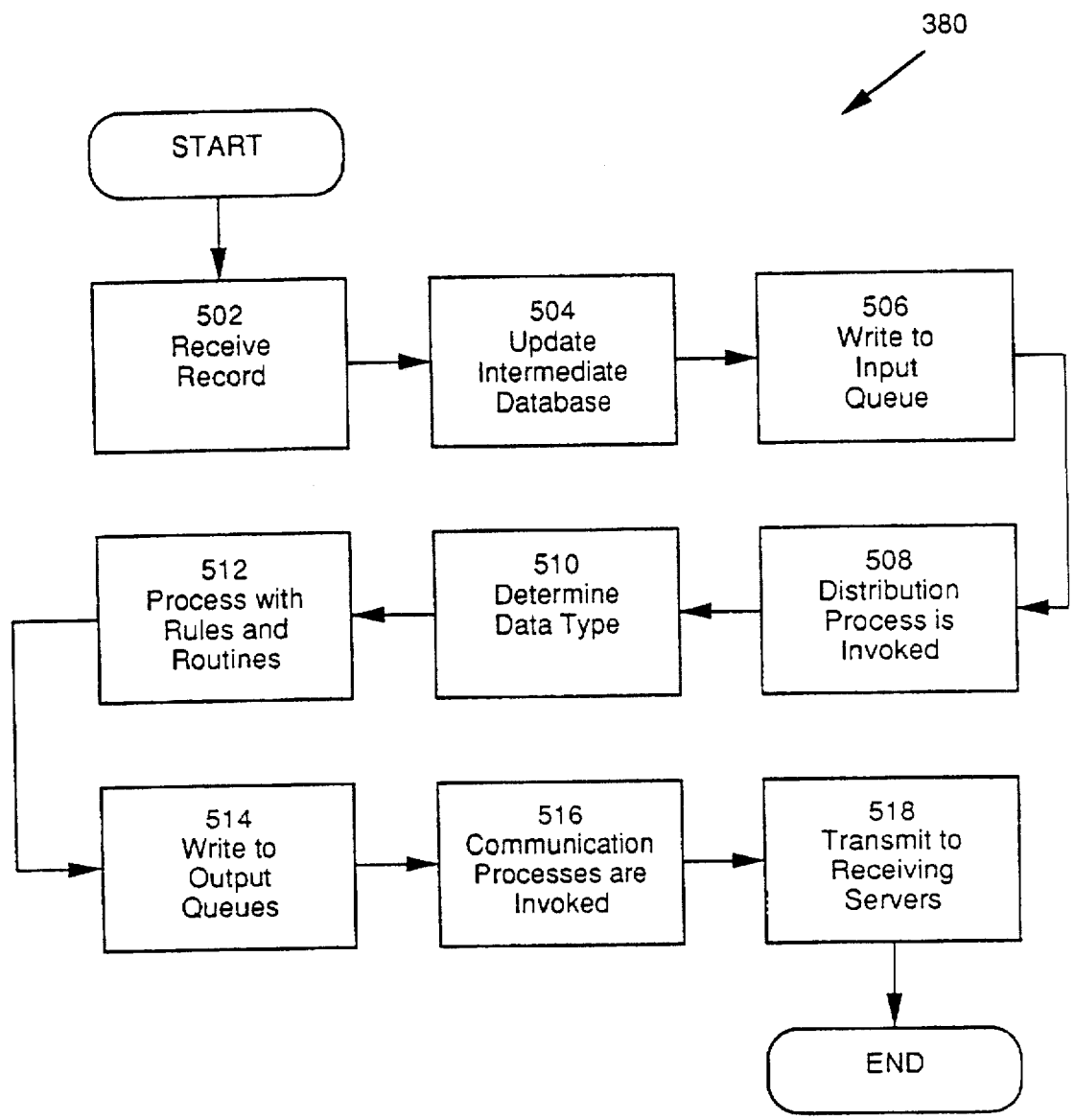

FIG. 5a is a flow diagram of intermediate distribution process 380, which is implemented by program instructions executed by the CPU of each intermediate server. It is best understood when viewed in conjunction with FIG. 2a. Process 380 begins with step 502, in which an update data record is received by the receiver process of an intermediate server from a higher level system, which is either master database server 204 or a higher level intermediate system. In step 504, the update data record is written by the receiver process of the intermediate server to the intermediate database. In step 506, the update data record is written to the distribution queue. In step 508, the distribution process is invoked. The distribution process is event driven, that is, the writing of a record to the distribution queue causes the distribution process to be invoked. In step 510, the distribution process determines the data type of the update data record being processed. In step 512, the update data record is processed as specified by the distribution rules for that record's data type. The distribution rules specify reformatting and transformations to be performed to the update data record, as well as more extensive data assembly and data view routines. The data assembly routines are capable of assembling an update data record from one or more received update data records and from records already present in the database. The data view processing routines are capable of individually processing the fields of one or more received update data records and other records and selectively including these fields in any arrangement in the output update data record. The rules also specify the lower level servers and output queues to which each update data record is to be written. Each update data record is processed separately for each output queue to which it is to be written. Therefore, an update data record written one output queue may be processed differently from the same record written to a different output queue. In step 514, the update data record is written to each output queue specified by the distribution rules. In step 516, the communication processes are invoked. The communication processes are event driven, that is, the writing of a record to an output queue causes the corresponding communication process to be invoked. In step 518, each active communication process transmits its associated output queue to the specified receivers. Process 380 then ends.

Figure 5B:
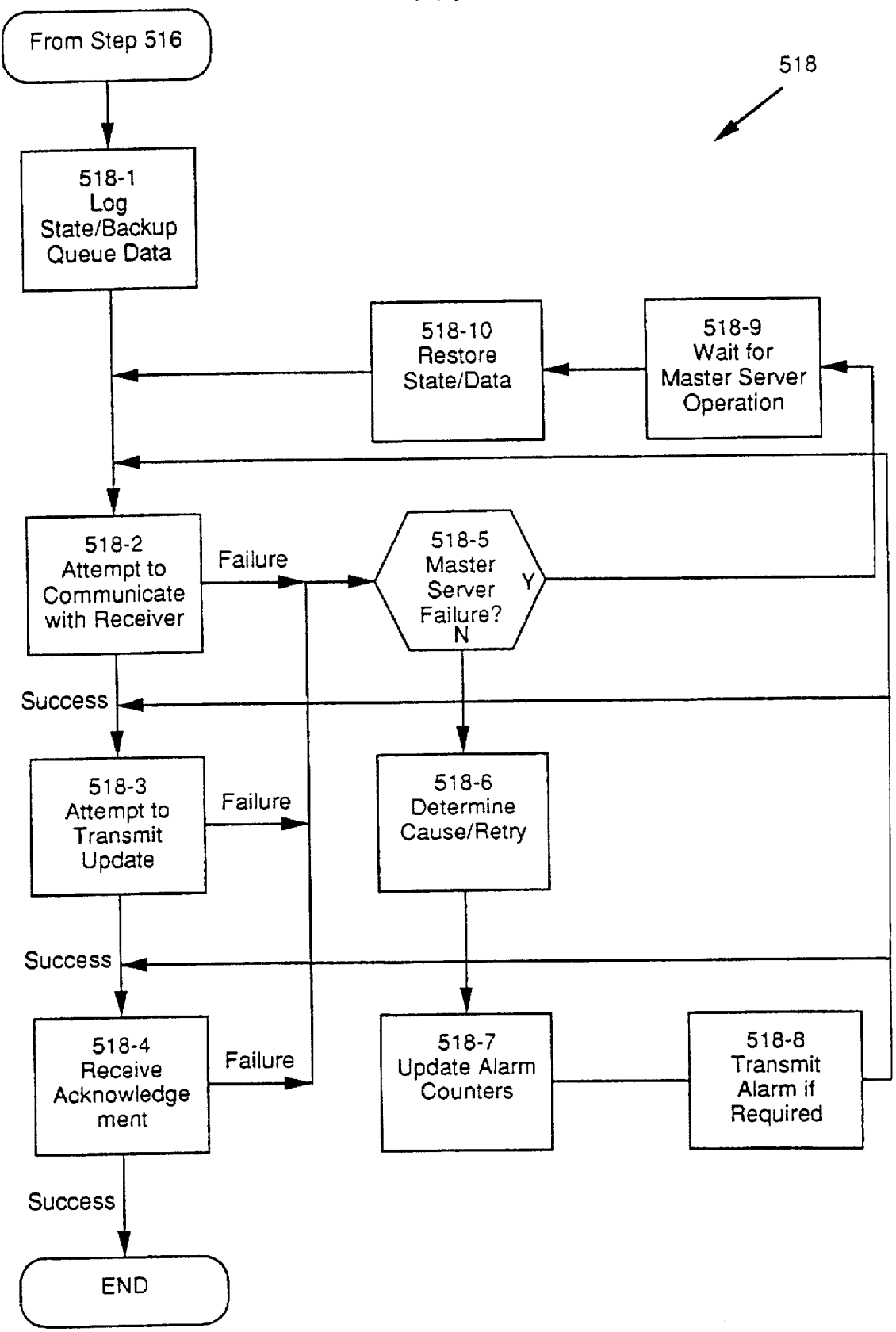

FIG. 5b is a flow diagram of a subprocess of step 518 of intermediate distribution process 380. The subprocess of step 518 of intermediate distribution process 380 is similar to step 418 of master distribution process 360, except that the transmitting server is an intermediate server and the receiving server is either an intermediate server or a destination server. Subprocess 518 interacts with the subprocess of step 502, executing on lower-level intermediate servers, and with the subprocess of step 602, executing on destination servers, as is explained below.

Figure 5C:
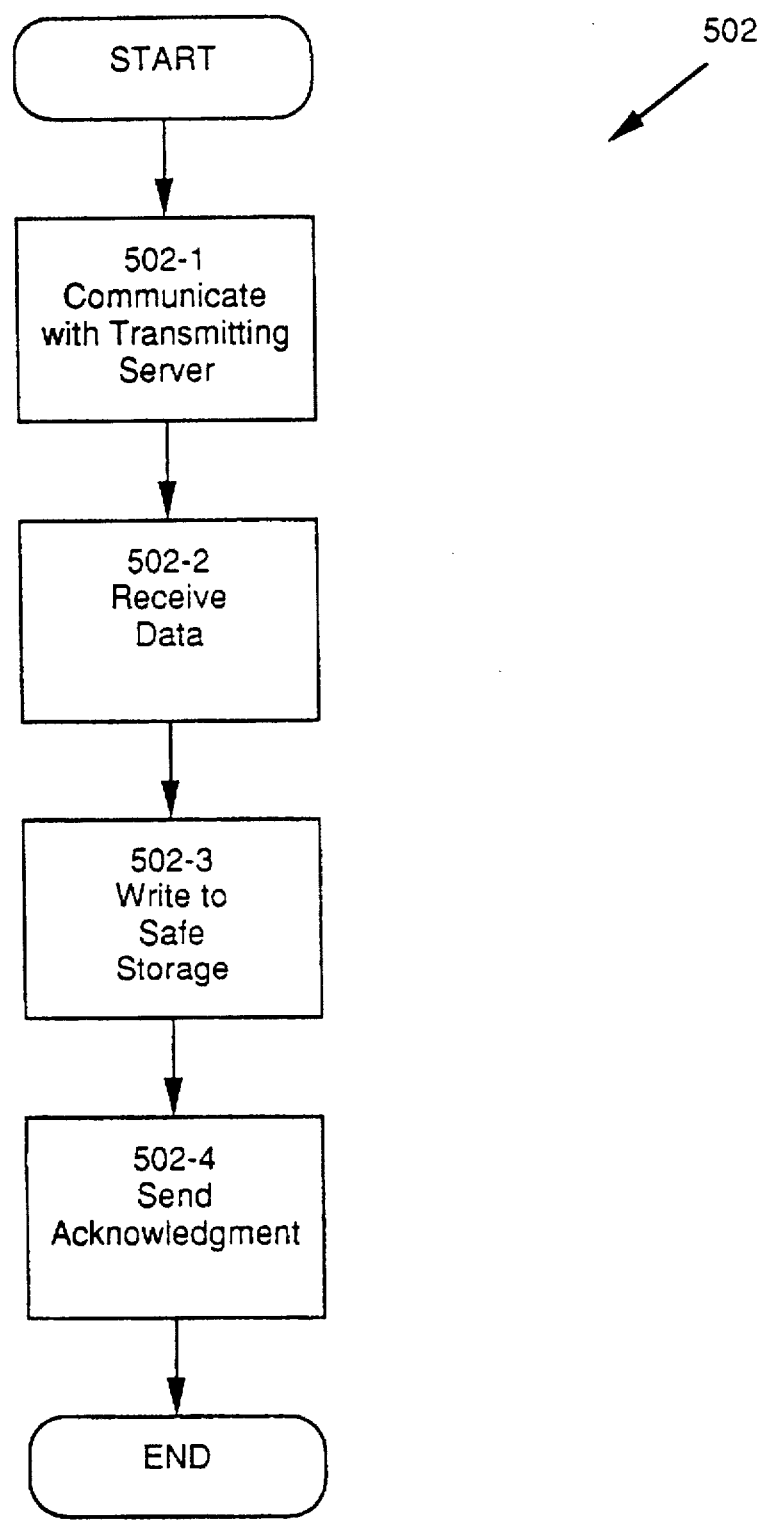

FIG. 5c is a flow diagram of a subprocess of step 502 of intermediate distribution process 380. The subprocess 502 interacts with the subprocess of step 418 of master distribution process 360 and with the subprocess of step 518 of instances of intermediate distribution process 380 executing on higher level intermediate servers. The subprocess begins in step 502-1, in which the intermediate server responds to an attempt to establish communications by a higher level server. If the higher level server is master server 204, step 502-1 responds to an attempt by master server 204 to establish communications in step 418-2 of master distribution process 400. If the higher level server is a higher-level intermediate server, step 502-1 responds to an attempt by the higher level intermediate server to establish communications in step 518-2 of process 500. In either case, subprocess 502 responds to an attempt to establish communications by a higher level server.

In step 502-2, the subprocess receives data transmitted to the intermediate server from a higher level server in either step 418-3 or step 518-3. In step 502-3, the subprocess writes the received data to safe storage. In step 502-4, the subprocess sends an acknowledgment to the higher level server which receives it in either step 418-4 or step 518-4. The subprocess then ends.

Figure 6A:
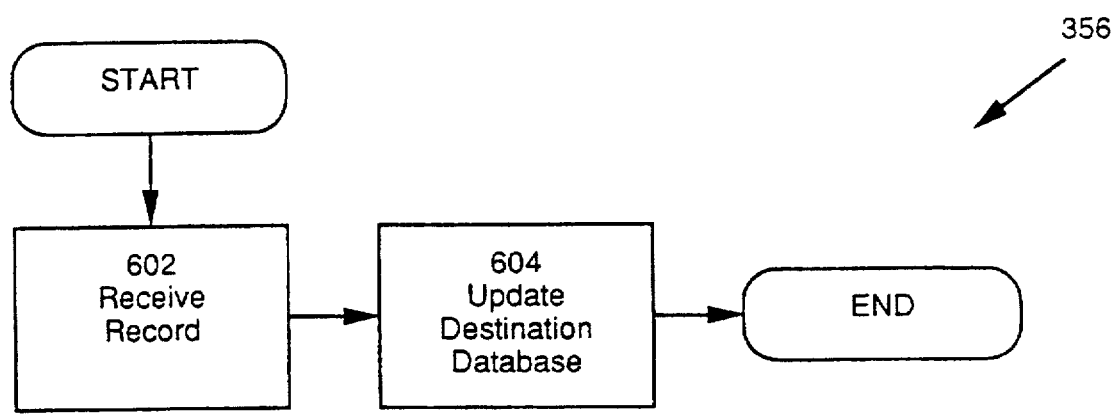

FIG. 6a is a flow diagram of destination process 356, which is implemented by program instructions executed in the CPU of each destination server. It is best understood when viewed in conjunction with FIG. 2a. Process 356 begins in step 602, in which an update data record is received at a destination server from a higher level system. In step 604, the update data is written to the destination database. Process 356 then ends.

Figure 6B:
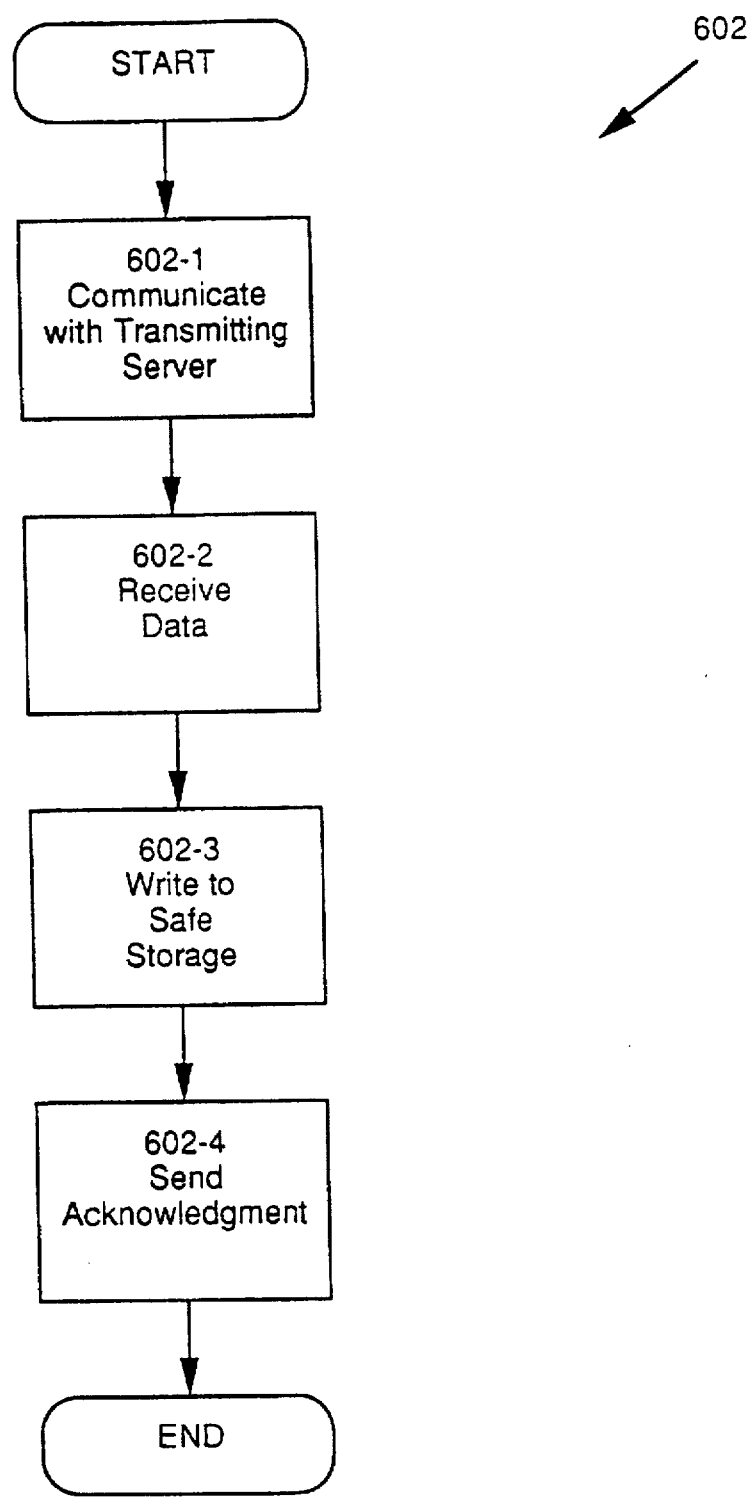

FIG. 6b is a flow diagram of a subprocess of step 602 of destination process 356. Subprocess 602 interacts with the subprocess of step 518 of instances of intermediate distribution process 380 executing on intermediate servers. Subprocess 602 is similar to the subprocess of step 502 of process 500, except that the transmitting server is always an intermediate server and the receiving server is a destination server.

Figure 7:
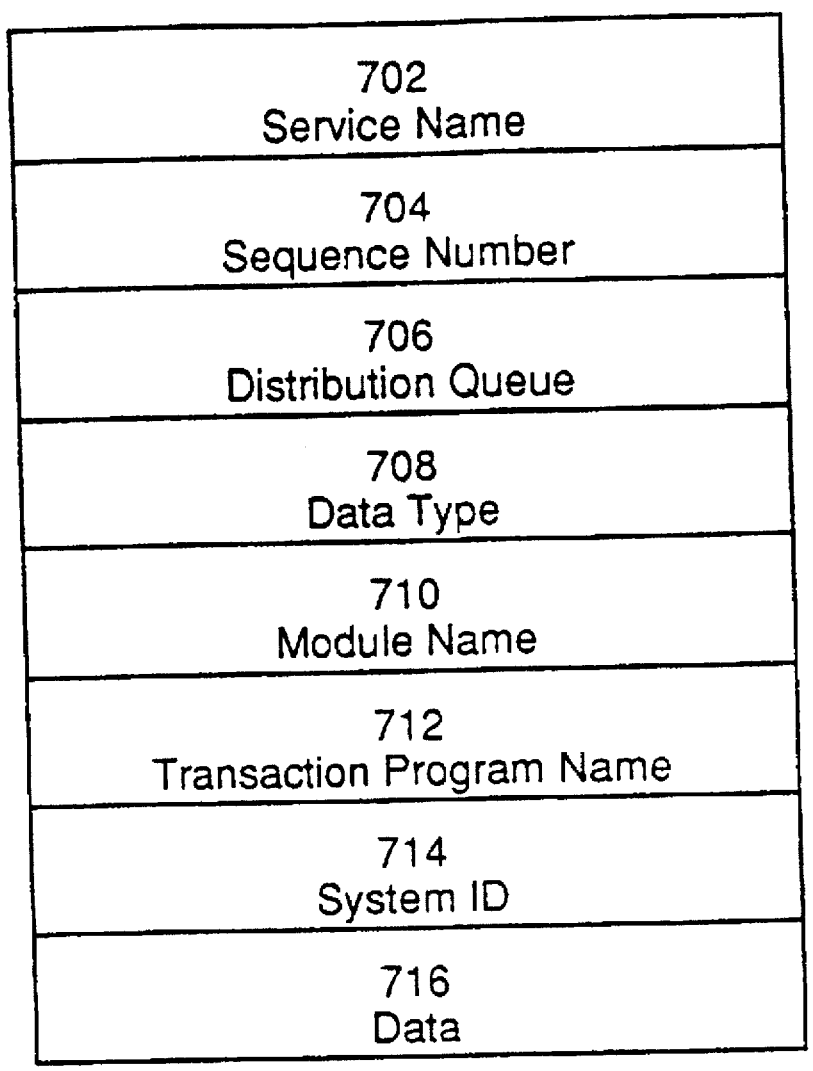
FIG. 7 is an exemplary format of an update data record used in system 200.

FIG. 7 is an exemplary format of an update data record. Service Name 702 is the name of the service or data type being defined. This field is typically populated by the application creating the data. Sequence Number 704 is a number that allows sequences and ordering of service names. Distribution Queue 706 is the name of the messaging queue in which to place this data for delivery. Data Type 708 is an indicator of the representation type to use for the data. Formats such as, for example big endian, little endian, ASCII, EBCDIC, etc. are indicated. Module Name 710 is the name of a specialized data assembly module and/or data view module that is to be invoked for this distribution definition. Transaction Program Name 712 indicates the transaction program which is to be invoked as the message is being delivered. System ID 714 is the name of the remote system to which the data is to be distributed. Data 716 is the new data which is to be entered into the database.

Although specific embodiments have been disclosed, it is understood by those of skill in the art that other equivalent embodiments are possible.

What is claimed is:

1. In a hierarchical distributed computing environment including a plurality of servers arranged in at least three levels of hierarchy, the highest level of hierarchy including at least one highest level server, the lowest level of hierarchy including at least one lowest level server and there being at least one intermediate level of hierarchy including at least one intermediate level server, each server including at least one database, a method for replicating changes effected to a database of said highest level server to databases of servers at the other levels of hierarchy, comprising the steps of:

a) said highest level server, in receipt of a change to a database thereof, transmitting an indicator of said change to at least one server of an intermediate level of hierarchy;

b) said intermediate level server, in receipt of said indicator of said change, entering said change into a database thereof, and thereafter transmitting an indicator of said change to at least one lower level server, and c) said lower level server, in receipt of said indicator of said change from said intermediate level server, entering said change into a database thereof.

2. The method of claim 1, wherein said highest level server includes a distribution table, said highest level server further performing the step of:

determining an intermediate level server to which an indicator of the change therefrom is to be transmitted by referencing said distribution table.

3. The method of claim 1, wherein said intermediate level server includes a distribution table, said intermediate level server further performing the step of:

determining the servers to which an indicator of said change therefrom is to be transmitted by referencing said distribution table.

4. The method of claim 1, wherein said highest level server further performs the step of:

reformatting said indicator of said change from the format of said highest level server to the format of said intermediate level server, the format being determined by reference to a distribution table.

5. The method of claim 1, wherein said intermediate level server further performs the step of:

reformatting said indicator of said change from the format of said intermediate level server to the format of the server to which the indicator is to be transmitted, the format being determined by reference to a distribution table.

6. The method of claim 1, wherein said highest level server further performs the step of:

assembling said indicator of said change by use of data assembly routines indicated by a distribution table.

7. The method of claim 1, wherein said intermediate level server further performs the step of:

assembling said indicator of said change by use of data assembly routines indicated by a distribution table.

8. The method of claim 1, wherein said highest level server further performs the step of:

assembling said indicator of said change by use of data view routines indicated by a distribution table.

9. The method of claim 1, wherein said intermediate level server further performs the step of:

assembling said indicator of said change by use of data view routines indicated by a distribution table.

10. The method of claim 1, wherein said step (a) further comprises the steps of:

retransmitting said indicator of said change to at least one intermediate level server if the previous transmission was unsuccessful; and transmitting an indicator of transmission failure if the number of unsuccessful transmissions exceeds a predetermined limit.

11. The method of claim 10, wherein, for said step (b), said highest level server further saves the indicator of said change and an indicator of the progress of transmission of said indicator of said change; and if said highest level server fails, restores the saved indicator of said change and said indicator of the progress of transmission of said indicator of said change after restoration of operation of said highest level server.

12. The method of claim 1, wherein said step (b) further comprises the steps of:

retransmitting said indicator of said change to at least one lower level server if the previous transmission was unsuccessful; and transmitting an indicator of transmission failure if the number of unsuccessful transmissions exceeds a predetermined limit.

13. The method of claim 12, wherein, for said step (b), said highest level server further saves the indicator of said change and an indicator of the progress of transmission of said indicator of said change; and if said highest level server fails, restores the saved indicator of said change and an indicator of the progress of transmission of said indicator of said change, upon restoration of operation of said highest level server.

14. The method of claim 1, wherein each highest level server and each intermediate level server has a distribution table, data assembly routines indicated by the distribution table and an input queue for receiving an indicator of a change, and wherein, in response to entry of an indicator of said change into said input queue, said each highest level server and each intermediate level server performs the steps of:

referencing its distribution table to determine the at least one server to which an indicator of said change is to be transmitted;

referencing its distribution table to reformat the indicator of said change; and using the data assembly routines indicated by its distribution table to assemble the indicator of said change.

15. The method of claim 14, wherein each highest level server and each intermediate level server has at least one communication queue for receiving an indicator of said change after said change has been reformatted and assembled, said each server transmitting the indicator of said change from its communication queue in response to receipt of the indicator by the communication queue.

16. A hierarchical distributed computing environment having a hierarchy of at least a highest level and a lowest level, comprising:

at least one highest level server transmitting an indicator of a change to its database to a server at a lower level;

at least one intermediate level server for receiving said indicator of said change from said highest level server and transmitting it to a server at a level lower than the level of said intermediate level server;

at least one lowest level server for receiving said indicator of said change and entering said change to its database; and a data communications network, coupled to said servers, for communicating data including said indicator of said change and said change between said servers.

17. The hierarchical distributed computing environment of claim 16, wherein said highest level server comprises:

a processor;

a memory, coupled to and accessible by said processor, for storing data to be processed by said processor, said memory including a database in which data is stored;

a data receiver, coupled to said processor, for receiving indicators of changes to be made to data stored in said database;

a database modifier, coupled to said data receiver, for entering modifications to the data in said database according to any received indicator of any change; and a data transmitter, coupled to said processor and said data communications network, for transmitting said any indicator of any change from said highest level server to at least one intermediate level server.

18. The hierarchical distributed computing environment of claim 17, wherein said highest level server further comprises:

a distribution table stored in said memory; and a destination determiner coupled to said distribution table for determining the at least one intermediate level server to which said any indicator of said any change is to be transmitted from said highest level server by reference to said distribution table.

19. The hierarchical distributed computing environment of claim 17, wherein said highest level server further comprises:

a reformatter coupled to said data receiver for reformatting said any indicator of said any change from the format of said highest level server to the format of said one intermediate level server by reference to said distribution table.

20. The hierarchical distributed computing environment of claim 17, wherein said highest level server further comprises:

an indicator assembler for assembling said any indicator of said any change by use of data assembly routines indicated by said distribution table.

21. The hierarchical distributed computing environment of claim 17, wherein said highest level server further comprises:

an input queue, contained in said memory, for receiving said any indicator of said any change; and an indicator output device, coupled to said input queue, for determining any server to which said any indicator is to be transmitted, reformatting said any indicator and assembling said any indicator in response to entry of said any change into said queue.

22. The hierarchical distributed computing environment of claim 17, wherein said data transmitter of said highest level server is coupled to said database modifier and said one intermediate level server, wherein said data transmitter repetitively transmits said any indicator of said any change to said one intermediate level server if previous transmissions thereto were unsuccessful, said data transmitter further comprising:

a failure transmitter, coupled to said data transmitter, for transmitting an indicator of transmission failure if the number of unsuccessful transmissions exceeds a predetermined limit.

23. The hierarchical distributed computing environment of claim 17, wherein said intermediate level server comprises:

a processor;

a memory, coupled to and accessible by said processor, for storing data to be processed by said processor, said memory including a database in which data is stored;

a data receiver, coupled to said processor and said data communications network, for receiving indicators of changes to be made to the data in said database;

a database modifier, coupled to said data receiver, for entering modifications to the data in said database according to any received indicator of any change; and a data transmitter, coupled to said processor and said data communications network for, transmitting said any indicator of said any change from said intermediate level server to at least one server at a level lower than said intermediate level server.

24. The system of claim 23, wherein each highest level server and each intermediate level server comprises:

a distribution table stored in the memory of said server;

data assembly routines, stored in said memory, indicated by said distribution table;

an input queue in said memory for receiving an indicator of any change;

a destination determining device, coupled to said distribution table and said input queue, for determining any server to which said indicator of said any change is to be transmitted by reference to said distribution table, in response to the entry of said any change into said input queue;

a reformatter, coupled to said distribution table and said input queue, for reformatting each indicator by reference to said distribution table, in response to entry of said any change into said input queue; and an indicator assembler, coupled to said data assembly routines and said input queue, for assembling said indicator of said any change using said data assembly routines indicated by said distribution table in response to the entry of said any change into said input queue.

25. The system of claim 24, wherein said each highest level server and said each intermediate level server further comprises:

a communication queue, coupled to said indicator assembler, for receiving an indicator of said any change after said any change has been reformatted and assembled; and a data transmitter, coupled to said communication queue, for transmitting said indicator of said any change from said communication queue in response to receipt of said indicator by the communication queue.

26. The hierarchical distributed computing environment of claim 16, wherein said one intermediate level server comprises:

a processor;

a memory, coupled to and accessible by said processor, for storing data to be processed by said processor, said memory including a database in which data is stored;

a data receiver, coupled to said processor and said data communications network, for receiving indicators of changes to be made to the data in said database;

a database modifier, coupled to said data receiver, for entering modifications to the data in said database according to any received indicator of any change; and a data transmitter, coupled to said processor and said data communications network for, transmitting said any indicator of said any change from said intermediate level server to at least one server at a level lower than said intermediate level server.

27. The hierarchical distributed computing environment of claim 26, wherein said intermediate level server further comprises:

a distribution table stored in said memory; and a destination determiner coupled to said distribution table for determining the at least one server to which said any indicator of said any change is to be transmitted from said intermediate level server by reference to said distribution table.

28. The system of claim 26, wherein said intermediate level server further comprises:

a reformatter coupled to said data receiver for reformatting said any indicator of said any change from the format of said intermediate level server to the format of said one server to which said any indicator is to be transmitted by reference to said distribution table.

29. The hierarchical distributed computing environment of claim 26, wherein said intermediate level server further comprises:

an indicator assembler for assembling said any indicator of said any change by use of data assembly routines indicated by said distribution table.

30. The hierarchical distributed computing environment of claim 26, wherein said intermediate level server further comprises:

an input queue, contained in said memory, for receiving said any indicator of said any change; and an indicator output device, coupled to said input queue, for determining any server to which said any indicator is to be transmitted, reformatting said any indicator and assembling said any indicator in response to the entry of a change into the queue.

31. The hierarchical distributed computing environment of claim 26, wherein said data transmitter of said intermediate level server is coupled to said database modifier and said one lower level server, wherein said data transmitter repetitively transmits said any indicator of said any change to said one lower level server if previous transmissions were unsuccessful, said data transmitter further comprising:

a failure transmitter, coupled to said data transmitter, for transmitting an indicator of transmission failure if the number of unsuccessful transmissions exceeds a predetermined limit.

32. The hierarchical distributed computing environment of claim 16, wherein said one lowest level server comprises:

a processor;

a memory, coupled to and accessible by said processor, for storing data to be processed by said processor, said memory including a database in which data is stored;

a data receiver, coupled to said processor and said data communications network, for receiving indicators of changes to be made to the data in said database; and a database modifier, coupled to said data receiver, for entering modifications to the data in said database according to any received indicator of any change.

* * * * *